US006251511B1

(12) United States Patent
Cocault

(10) Patent No.: US 6,251,511 B1
(45) Date of Patent: Jun. 26, 2001

(54) PREFABRICATED ROOFING ELEMENT

(75) Inventor: Alain Cocault, Cugand (FR)

(73) Assignee: SCIEL Societe de Creation Integrale pour Enterprises et Loisirs, Clisson (FR)

( * ) Notice: Subject to any disclaimer, the term of this patent is extended or adjusted under 35 U.S.C. 154(b) by 0 days.

(21) Appl. No.: 09/529,545

(22) PCT Filed: Oct. 13, 1998

(86) PCT No.: PCT/FR98/02187

§ 371 Date: Apr. 14, 2000

§ 102(e) Date: Apr. 14, 2000

(87) PCT Pub. No.: WO99/19154

PCT Pub. Date: Apr. 22, 1999

(30) Foreign Application Priority Data

Oct. 14, 1997 (FR) .................................................. 97 12829

(51) Int. Cl.[7] ...................................................... B32B 15/08

(52) U.S. Cl. ......................... 428/301.4; 428/61; 428/195; 428/198

(58) Field of Search .............................. 72/379; 220/464, 220/469; 52/396, 403, 573, 58, 62; 428/594, 600, 53, 61, 62, 195, 198, 301.4

(56) References Cited

U.S. PATENT DOCUMENTS

| | | | | |
|---|---|---|---|---|
| 4,018,017 | * | 4/1977 | Schoop | 52/58 |
| 4,155,482 | * | 5/1979 | Swaney | 220/415 |
| 4,617,818 | * | 10/1986 | Fukuyori | 73/379 |
| 4,760,679 | * | 8/1988 | Thompson . | |

* cited by examiner

*Primary Examiner*—Merrick Dixon
(74) *Attorney, Agent, or Firm*—Young & Thompson

(57) ABSTRACT

A prefabricated roofing element in the form of a laminate consisting from its inner surface towards its outer surface exposed to poor weather conditions, of at least a first continuous layer constituting an element core based on a thermosetting binder and reinforcing materials, of a second continuous protective coating layer, consisting of a mixture of at least a synthetic resin, a constituent staining in its volume the resin and a catalyst. The roof cover element is characterized in that it further comprises at least a third discontinuous layer of paint unevenly distributed on the surface of the second layer and consisting of materials immiscible with the second layer constituents to form spots at the second layer surface.

10 Claims, No Drawings

PREFABRICATED ROOFING ELEMENT

CROSS REFERENCE TO RELATED APPLICATION

This is the 35 USC 371 national stage of International application PCT/FR98/02187 filed on Oct. 13, 1998, which designated the United States of America.

FIELD OF THE INVENTION

The present invention relates to a prefabricated roofing element in the form of a laminate.

It relates more particularly to a roofing element comprised, from its internal toward its external surface exposed to the weather, at least one first continuous layer constituting the core of said element and formed from a mixture of at least one binder and reinforcing material, a second continuous layer of a product that protects against ultraviolet and weather, called a GELCOAT, constituted of a mixture of at least one synthetic resin, preferably thermosetting, such as a polyester resin, of a constituent covering the mass of said resin and of a catalyst.

BACKGROUND OF THE INVENTION

Settable tiles have been used at present in many processes for covering dwellings. These tiles are generally constituted of baked clay permitting obtaining coverings that are quite sealed and resistant but heavy and exposed to breakage, in particular in the case of hail. There has accordingly appeared on the market, as a roof covering, plates of synthetic material on which has been stamped the shape of interfitting tiles. These lightweight plates, resistant to the weather, have nevertheless not been entirely a commercial success, essentially for two reasons. On the one hand, the use of materials such as Fibrociment (trademark), is dangerous to the health of users. On the other hand, these plates only badly imitate the natural appearance of conventional materials, such as tiles and slates, this poor imitation being moreover by a rapid degradation with time of their appearance.

Solutions of the first problem set forth above have been found and are set forth particularly in French patents FR-A-2.451.429 and FR-A-2.522.348. The roofing elements described in these patents are obtained by use of reinforced resins that do not risk the health of the occupants of a dwelling. However, the composition of such roofing elements and the processes for production are not satisfactory in terms of appearance of the product and in terms of long-term strength of this product.

The patent FR-A-2.522.348 teaches, to imitate the appearance of traditional products, the use of granulates which give rise to problems of homogeneity of the mixture and of the distribution of the granulates on the surface of the final product.

The patent FR-A-2.451.429 relates itself to the use of a colored GELCOAT having a rough appearance adapted to give rise to a certain number of drawbacks such as retention of dirt and the growth of moss in its roughened surface.

The patent FR-A-2.363.195 relates essentially to the production of a production mold in polyester or other thermal hardenable substance from a core clad with a plastic or hydraulic coating. This patent also describes a process for mass production of pieces by such a mold. This process comprises a step of cladding one wall of the mold with a colored GELCOAT, then a step of cladding this mold with a mixture of resin plus fibers. The GELCOAT could be present in the form of a continuous layer or in the form of specks of different colors. Such a document corresponds to the conventional production of a closed covering element of two layers, one constituting the core of the element, the other formed by a GELCOAT that gives long-term strength.

SUMMARY OF THE INVENTION

An object of the present invention is to overcome the drawbacks mentioned above by providing a prefabricated roofing element that very closely resembles conventional products, such as tiles and slates, which ages well and remains water-resistant and which will be producible by means of an industrial process.

Another object of the present invention is to provide a process for the production of a prefabricated roofing element that is easy to use and permits rapidly obtaining the finished product.

To this end, the invention has for its object a prefabricated roofing element of laminated form comprised, from its internal surface toward its external surface exposed to the weather, of at least one first continuous layer constituting the core of said element and formed from a mixture of at least one thermosetting binder and a reinforcing material, a second continuous layer of a protective coating against ultraviolet and weather, a so-called "GELCOAT" constituted by a mixture of at least one synthetic resin, preferably thermosetting, such as a polyester resin, a covering material throughout the mass of the resin, and a catalyst, these elements being characterized in that it moreover comprises at least one third discontinuous layer of paint distributed irregularly over the surface of the second layer and comprised by material immiscible with the constituents of the second layer to form at the surface of the second layer spots conferring in cooperation with the second layer of said element an appearance imitating the appearance of conventional materials such as slates or tiles.

According to a preferred embodiment of the invention, the third layer of the covering element is constituted of paint essentially thermoplastic-based resins which are polyurethane, acrylic, or two-component acrylic-urethane resins, a catalyst adapted to promote polymerization of said resin, and pigments.

The invention also has for its object a process for the production of a prefabricated roofing element, characterized in that there are deposited by projection in the form of irregular droplets on the surface of the mold cavity of a mold of a shape corresponding to the shape of a portion of the covering element to be reproduced, a paint to form the so-called upper layer of a covering element of laminated roofing, in that after hardening this layer is covered with a second continuous layer of a coating that protects against weather and ultraviolet, a so-called gel coat, constituted by a synthetic resin-based mixture, which is preferably thermosetting and colored, which is not miscible with the paint of the upper layer, and that there is applied after hardening of this second layer, a layer adapted to form the core of said element, this layer being constituted by at least one reinforcing material and a thermosetting binder.

DETAILED DESCRIPTION OF THE INVENTION

The invention will be more particularly described hereafter in connection with an embodiment of the invention.

The roofing element which is the object of the invention is in the form of a piece or shape that is a function of the conventional material to be imitated. The shape is generally obtained by molding. Thus, in the case of a covering element imitating tile, the shaped piece imitates by its impressions several successive rows of elements such sa tiles, the edges of this piece being shaped to permit an assembly with overlapping edges during side-by-side positioning of two identical pieces on a roof frame.

This roofing element is in the form of a laminate comprised by at least three layers. The first layer, also called the core, of said element, and constituting the internal surface of said element, is comprised by a mixture of at least one thermosetting binder and reinforcing material. As thermosetting binder can be cited polyester, phenolic, furan, epoxy or other resins. However, in a preferred embodiment of this core, the latter is constituted by a mixture of at least one thermosetting resin colored throughout its mass, such as a colored polyester resin, and glass fibers, the glass fibers being present in said mixture in a proportion comprised within the range of 20 to 30% by weight. By way of example, for this first layer, there can be fused an unsaturated polyester resin diluted with styrene and methacrylate. This resin is accelerated by means of an accelerator, such as a solution of cobalt octoate at 6% by weight, then hardened by means of a catalyst, such as a peroxide, either of methyl ethyl ketone or of acetyl acetone (2–4-pentanedione). Such a resin is available commercially and sold by the Reichold company under the mark Dion FR 7722.00. Other unsaturated pre-accelerated polyester resins such as the resin Viapal VUP 4754 BEMT produced by Vianova Resins, can be used.

The second layer of this element is a continuous layer of a protective coating, a so-called gel coat, constituted by a mixture of at least one synthetic resin, preferably thermosetting, such as polyester resin, a constituent coloring said resin throughout its mass, and a catalyst. The thickness of this second layer is generally comprised within the range of 0.3 to 0.5 mm. Moreover, the constituents of the first and second layers that color said layers are selected such that the color of the first layer is identical to that of the second layer. As a coloring constituent throughout the mass of said resin, can be cited titania (rutile) treated with chlorine. More generally, the coloring materials of the core and of the second layer are obtained from white, blue or black bases for a covering element imitating slate and from yellow, red or orange for a covering element imitating tile. In other words, the final colors of the core and of the second layer can be, for a covering element imitating slate, of the type RAL 7015, 7016 or 7021, and for a covering element imitating tile, of the type RAL 2001 to 2010.

This laminate also comprises at least one third layer constituted in the external surface exposed to weather, of said element. This third layer is a discontinuous layer of paint distributed irregularly over the surface of the second layer. This third layer is comprised of material immiscible with the constituents of the second layer to form at the surface of the second layer spots giving the element, in cooperation with the second layer, an appearance imitating that of the conventional materials such as slates or tiles. This third layer is preferably constituted by a paint with a base that is essentially a resin selected from the group of polyurethane, acrylic, acrylic-urethane resins, of a catalyst adapted to promote the polymerization of said resin, and of pigments of a black shade.

This paint which constitutes a third layer covers at most 15% of the surface of the second layer. This third layer is applied to the surface of the second layer in the form of droplets, by projection. The details of this projection will be described hereafter. Generally, the resin of this third layer is constituted by a base belonging preferably to the family of hydroxylated acrylic compounds and/or urethane base compounds, and a diluent constituted by an organic solvent, such as 2-butoxyethyl acetate, ethyl acetate or the like. The catalyst generally belongs to the family of polyisocyanates. Thus, as a base, there can be used a Deltron HS base 914 produced by PPG Industries SA and constituted essentially of isocyanate prepolymers (free N=C=O) and of organic solvents. By way of diluent, there can be used the diluent D807 S0741 of PPG Industries SA and as catalyst the D802 hardener STP of this same company. The color of the paint varies according to the aging appearance that is desired.

Also, with respect to what has been stated above, a composition type of a roofing element could be defined as follows:

Core of the element:

Accelerator: 6% cobalt octoate=0.5% by weight of the total resin Resin: M1-Dion FR 7722.00 (Reichold)=75–85% by weight M4-Viapam VUP 4754 Bemt (Vianova Resins) 65.75% by weight Catalyst: peroxide type methyl ethyl ketone=10–35% of the total weight of the resin Glass fibers=15–35% by weight Pigments: titania (rutile) treated with chlorine Gelcoat Pigments=titania (rutile) treated with chlorine Accelerator=6% cobalt octoate=0.5% of the total weight of the resin Catalyst=peroxide type methyl ethyl ketone= 10–35% of the total weight of the resin Resin=Medogel series M (Medoc paints) or gel coat NI 11 (Reichold):300 g–600 g/m$^2$ Third laver Paint: deltron base HS except 914 (PPG Industries SA): 2 volumes Diluent: D870 S0741 (PPG Industries SA): 2 volumes Catalyst: D802 hardener STD (PPG Industries SA): 1 volume To obtain such a roofing element, one proceeds generally in the following manner. First, a mold is made, generally of synthetic material to permit obtaining shapes like those of a portion of a traditional covering. On the surface of this mold corresponding to the bottom of the mold cavity, there is deposited by spraying, in the form of irregular droplets, a polyurethane or acrylic or two-component acrylic-urethane paint to form the so-called upper layer of the laminated roof covering element. This projection takes place by means of pneumatic gravity spray guns. There is selected a high flow rate of paint and a low air pressure to obtain by gravity fall, an irregular spraying of the paint.

Ordinarily, before this step of paint deposition, there is applied to the surface of the mold cavity at least one demolding agent. At least one of the demolding agents is constituted by polyvinyl alcohol to give a mat finish to the covering element when completed. In addition to polyvinyl alcohol, there could be used a demolding agent selected from the following compounds:

- liquid or paste wax of the FK wax type made by peintures du médoc SA,
- semi-permanent agent of the type moulex 2000 made by peinture du médoc. This or these demolding agents are generally also applied by pneumatic gravity spray gun. The catalyst, adapted to promote drying of the paint, is projected simultaneously with the paint, the catalyst/paint mixture having been first formed. This spraying operation is carried out within a heated tunnel so as to activate the polymerization. The hot air is projected through nozzles in the tunnel. These hot air inlets take part in obtaining irregular projections of paint.

Once this operation of depositing the paint is carried out, the mold is brought to the gelcoat application station. This application takes place again with a spray gun. The mold moves within the heated tunnel to receive therein a layer adapted to constitute the core of said covering element. This layer is constituted of glass fibers and a polymerizable resin colored throughout its mass. The latter is also applied by spray gun. The presence of glass fibers requires subsequent bubble removal from this layer. This bubble removal can be carried out by means for example of a load of steel balls disposed within a polyurethane envelope, the assembly being applied to the surface from which bubbles are to be removed.

Once the debubbling operation is completed, the piece is removed from the production installation and can be stored for mounting on a roof frame. In the course of its fabrication, it is preferable that this piece be exposed to a temperature of the order of 30° C.–60° C. to accelerate all polymerizations.

In the case of production of slates, the mold is in the course of the first step a projection of a paint, maintained in kind to give the obtained spots formed by paint projection, the appearance of running, better imitating slate.

What is claimed is:

1. A prefabricated roofing element in the form of a laminate, comprising, from its internal surface toward its external surface exposed to the weather, at least one first continuous layer constituting a core of said element and formed from a mixture of at least one thermosetting binder and reinforcing materials;

a second continuous layer of a coating that protects against weather and ultraviolet, said second continuous layer being constituted by a mixture of at least one synthetic resin, a coloring constituent throughout the mass of said resin, and a catalyst; and at least one third discontinuous layer of a paint distributed irregularly over the surface of the second layer and comprised by materials that are not miscible with the constituents of the second layer, to form at the surface of the second layer spots which give, in cooperation with the second layer of the element, an appearance imitating that of conventional slates or tiles.

2. The prefabricated roofing element according to claim 1, wherein the core of said element is constituted by a mixture of at least one thermosetting resin colored throughout its mass and glass fibers; the glass fibers being present in said mixture in a proportion ranging from 20% to 30% by weight.

3. The prefabricated roofing element according to claim 2, wherein the thermosetting resin colored throughout its mass is a colored polyester resin.

4. The prefabricated roofing element according to claim 1, wherein the second layer has a thickness ranging from 0.3 mm to 0.5 mm.

5. The prefabricated roofing element according to claim 1, wherein the constituents of the first layer and of the second layer serving to color said first and second layers are selected such that the coloring of the first layer is identical to that of the second layer.

6. The prefabricated roofing element according to claim 1, wherein the third layer is constituted of a) a paint of a base which is essentially a resin selected from the group consisting of polyurethane, acrylic, and acrylic-urethane resins, and b) of a catalyst adapted to promote the polymerization of said resin, and c) of pigments.

7. The prefabricated roofing element according to claim 1, wherein the paint constituting the third layer covers at most 15% of the surface of the second layer.

8. The prefabricated roofing element according to claim 1, wherein the third layer is applied to the surface of the second layer in the form of droplets by projection.

9. Process for the production of a prefabricated roof covering element, which comprises:

providing a mold having a mold cavity and a shape corresponding to the shape of a portion of a covering to be reproduced;

depositing, by spraying in the form of irregular droplets at the surface of the mold cavity, a paint to form a discontinuous upper layer of a laminated roofing element;

allowing said upper layer to harden;

covering said upper layer after hardening with a continuous second layer of a coating for protection against weather and ultraviolet; said second layer comprising a mixture based on a synthetic resin, which is colored and is immiscible with the paint of the upper layer;

allowing said second layer to harden; and applying, after hardening of said second layer, a core layer suitable to form the core of said element; said core layer comprising at least one reinforced material and a thermosetting binder.

10. The process according to claim 9, further comprising prior to spraying the paint, coating the mold cavity with at least one demolding agent comprising polyvinyl alcohol, to give a mat finish to the covering element.

* * * * *